(12) United States Patent
Jabbouri et al.

(10) Patent No.: US 10,872,167 B2
(45) Date of Patent: Dec. 22, 2020

(54) APPLICATION PROGRAMMING INTERFACES FOR CLASSROOM NOTEBOOK SETTINGS

(71) Applicant: Microsoft Technology Licensing, LLC, Redmond, WA (US)

(72) Inventors: Suleiman Jabbouri, Redmond, WA (US); Michael E. Tholfsen, Newcastle, WA (US); Jason Silvis, Bellevue, WA (US); Jorge A. Lara Garduno, Seattle, WA (US); Nicolas Saul, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 508 days.

(21) Appl. No.: 15/636,087

(22) Filed: Jun. 28, 2017

(65) Prior Publication Data

US 2018/0336367 A1 Nov. 22, 2018

Related U.S. Application Data

(60) Provisional application No. 62/509,627, filed on May 22, 2017.

(51) Int. Cl.
*G06F 21/62* (2013.01)
*G06F 21/31* (2013.01)
*G06F 21/60* (2013.01)

(52) U.S. Cl.
CPC .......... *G06F 21/6245* (2013.01); *G06F 21/31* (2013.01); *G06F 21/604* (2013.01)

(58) Field of Classification Search
CPC ..... G06F 21/6245; G06F 21/31; G06F 21/604
See application file for complete search history.

(56) References Cited

U.S. PATENT DOCUMENTS

| | | | | |
|---|---|---|---|---|
| 5,784,619 | A | * 7/1998 | Evans | G06F 9/451 719/328 |
| 2005/0234943 | A1 | * 10/2005 | Clarke | H04L 67/38 |
| 2006/0172274 | A1 | 8/2006 | Nolasco | |
| 2006/0195461 | A1 | * 8/2006 | Lo | G06F 16/93 |

(Continued)

OTHER PUBLICATIONS

The Box Developer Platform, "The Box Content API" https://web.archive.org/web/20160819020330/https://docs.box.com/reference, Aug. 19, 2016. (Year: 2016).*

(Continued)

*Primary Examiner* — Ali S Abyaneh
*Assistant Examiner* — Zoha Piyadehghibi Tafaghod
(74) *Attorney, Agent, or Firm* — Talem IP Law, LLP

(57) ABSTRACT

Application programming interfaces (API) are provided for class notebook settings. The APIs allow for a teacher or other user of a class notebook to manage permissions to the class notebooks, and particularly allow for fine control over parts of the class notebook through a class notebook application. An API for generating a guest access link is provided. APIs for creating permission groups for a collaboration space are provided. A post permission API is provided that creates or updates the permission for a section group. A get permission API is provided that retrieves permission information of a section group. A delete permission API is provided that removes permission for a user of a section group.

20 Claims, 13 Drawing Sheets

(56) References Cited

U.S. PATENT DOCUMENTS

| | | | | |
|---|---|---|---|---|
| 2007/0130339 | A1* | 6/2007 | Alcorn | G09B 5/02 709/225 |
| 2011/0035351 | A1* | 2/2011 | Levy | G06N 5/02 706/52 |
| 2013/0174274 | A1* | 7/2013 | Friedman | G06Q 30/0251 726/28 |
| 2014/0020115 | A1* | 1/2014 | Le Chevalier | G06F 16/248 726/28 |
| 2016/0134583 | A1* | 5/2016 | Kumar | H04L 51/36 709/206 |
| 2016/0162702 | A1 | 6/2016 | Tholfsen et al. | |
| 2016/0203724 | A1 | 7/2016 | Heenan et al. | |
| 2016/0277401 | A1* | 9/2016 | Yamada | H04L 63/0876 |

OTHER PUBLICATIONS

Webster, Darrel, "One Note Class Notebook Creator-Officially Launched", http://webster.net.nz/2014/10/onenote-class-notebook-creator-officially-launched/, Published on: Oct. 8, 2010, 12 pages.

"Teacher only spaces, Collaboration Space lockdown, subgroup creation and more with the new Class Notebook API updates", https://blogs.office.com/2016/05/24/teacher-only-spaces-collaboration-space-lockdown-subgroup-creation-and-more-with-the-new-class-notebook-api-updates/, Published on: May 24, 2016, 3 pages.

Salleh, et al., "Managing Students' Electronic Disciplinary Records via E-Merit Web Content Management System", in Proceedings of IEEE Conference on Open Systems, Sep. 25, 2011, pp. 261-266.

"Managing Notebooks", http://docs.qubole.com/en/latest/user-guide/notebook/manage-notebook.html, Retrieved on: May 1, 2017, 21 pages.

"OneNote Class Notebook updates include read-only parent or guardian access and Collaboration Space permissions", https://blogs.office.com/2017/04/19/onenote-class-notebook-updates-include-read-only-parent-or-guardian-access-and-collaboration-space-permissions/, Published on: Apr. 19, 2017, 4 pages.

"Create sharing links on OneNote entities", https://msdn.microsoft.com/en-us/office/office365/howto/onenote-sharing-links, Retrieved on: May 8, 2017, 7 pages.

\* cited by examiner

APPLICATION PROGRAMMING INTERFACES FOR CLASSROOM NOTEBOOK SETTINGS

CROSS REFERENCE TO RELATED APPLICATION

This application claims the benefit of U.S. Provisional Application Ser. No. 62/509,627, filed May 22, 2017.

BACKGROUND

Digital classrooms are gaining popularity. The sharing and collaboration features of certain notebook applications, such as Microsoft OneNote®, and SMART Notebook®, as well as classroom directed applications such as Google Classroom®, can be useful in educational environments, providing a platform for interactive learning as well as distance learning. Access to a particular lesson plan or notebook may vary depending on the particular notebook application and platform.

BRIEF SUMMARY

Application programming interfaces (API) are provided for class notebook settings. The APIs allow for a teacher or other user of a class notebook to manage permissions to the class notebooks, and particularly allow for fine control over parts of the class notebook through a class notebook application. It is desirable to be able to add and remove student and other user's rights (e.g., read access, write access) to particular parts of a class notebook. The class notebook is a construct formed of section groups of a note. The section groups can include specific sections for an individual (e.g., student section group) and specific sections for a group (e.g., collaboration section group).

Usually, in order to access part of a class notebook, a person needs to be logged in to the system. However, it can be desirable to provide access to a guest with interest in the student's work (e.g., a parent, guardian, or tutor). An API for generating a guest access link is provided. A class notebook system can receive a request for a guest access link to a specified student's content in a section group of a class notebook. The class notebook system can then communicate with a file management system that is storing the class notebook to get or create a guest link to the section group for the specified student. In some implementations, the section group for the specified student is stored as a hidden folder by the file management system. Upon receiving the guest link, the class notebook system can create the guest access link by appending an online rendering flag to the guest link so a third party (e.g., the guest with interest in the student's work) can have a live view. The class notebook system can then provide the guest access link to a source of the request.

APIs for creating permission groups for a collaboration space are provided. A post permission API is provided that creates or updates the permission for a section group. In some cases, in response to receiving a request to post a permission for the section group, the class notebook system can communicate with a file management system to create or update the permission for the section group. The request can include a section group identifier, a user identifier, and a type of the permission.

A get permission API is provided that retrieves permission information of a section group. In some cases, in response to receiving a request to get a permission for the section group, the class notebook system can communicate with the file management system to receive the permission for the section group. The request can include the section group identifier and a permission object.

A delete permission API is provided that removes permission for a user of a section group. In some cases, in response to receiving a request to delete a permission for the section group, the class notebook system can communicate with the file management system to delete the permission for the section group. The request can include the section group identifier and a permission identifier.

DETAILED DESCRIPTION

Figure 1:
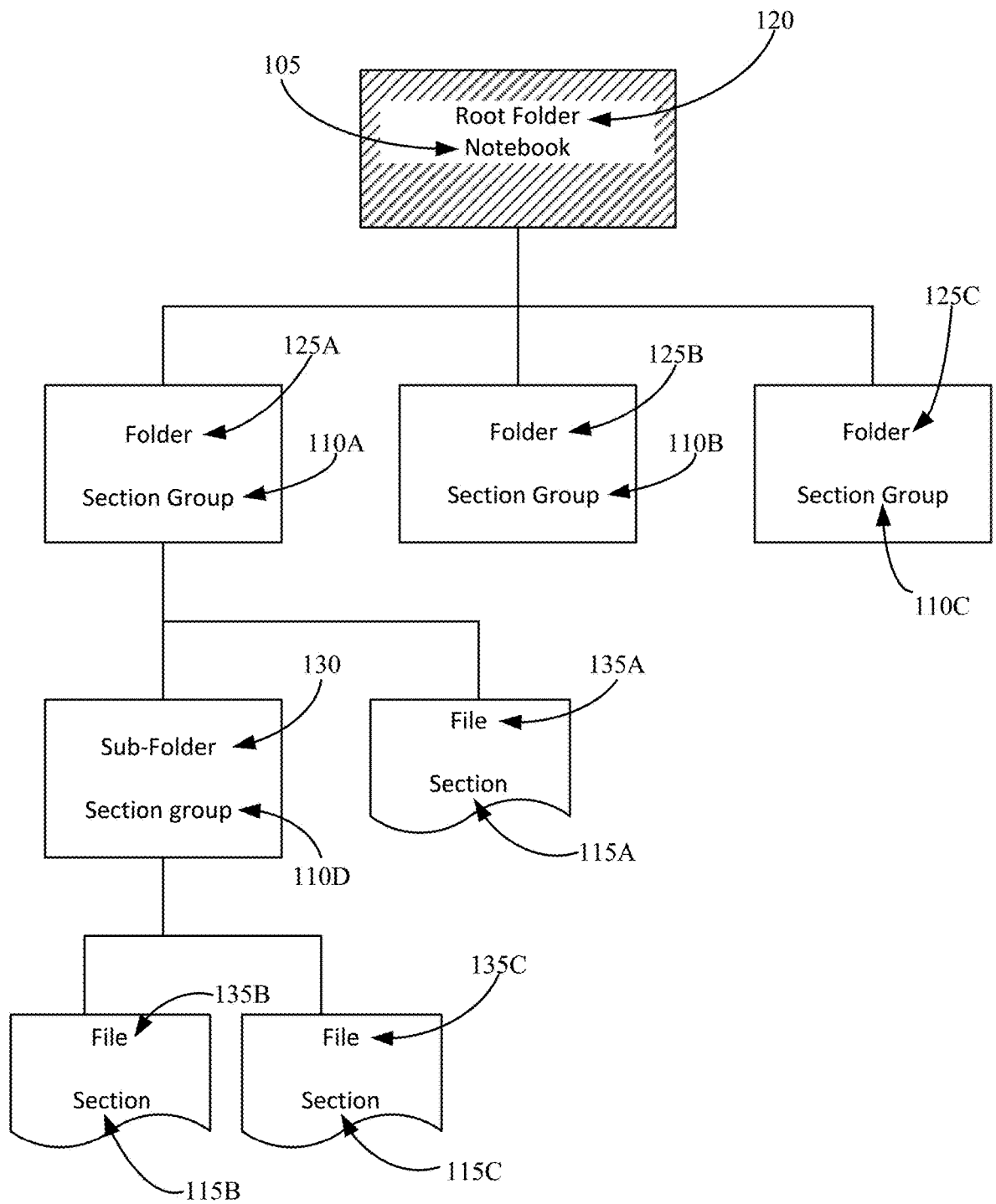
FIG. 1 shows a structure for a class notebook stored at a file management system and a structure for a class notebook stored at a class notebook system for an example implementation.

Application programming interfaces (API) are provided for class notebook settings. The APIs allow for a teacher or other user of a class notebook to manage permissions to the class notebooks, and particularly allow for fine control over parts of the class notebook through a class notebook application. It is desirable to be able to add and remove student and other user's rights (e.g., read access, write access) to particular parts of a class notebook. The class notebook is a construct formed of section groups of a note. The section groups can include specific sections for an individual (e.g., student section group) and specific sections for a group (e.g., collaboration section group).

Usually, in order to access part of a class notebook, a person needs to be logged in to the system. However, it can be desirable to provide access to a guest with interest in the student's work (e.g., a parent, guardian, or tutor). An API for generating a guest access link is provided. In one case of managing access to the class notebooks, the described APIs allow a teacher to generate an anonymous guest link that allows the end user (e.g., a parent or guardian) to access specific parts of the class notebook that are not normally accessible. This feature allows a parent to access a specific part of the class notebook that includes their child's content without giving the parent permissions to the rest of the class notebook. The read-only view directly into the class notebook allows the parent to view the content in real time.

A class notebook system can receive a request for a guest access link to a specified student's content in a section group of a class notebook. The class notebook system can then communicate with a file management system that is storing the class notebook to get or create a guest link to the section group for the specified student. In some implementations, the section group for the specified student is stored as a hidden folder by the file management system. Upon receiving the guest link, the class notebook system can create the guest access link by appending an online rendering flag to the guest link so a third party (e.g., the guest with interest in the student's work) can have a live view. The class notebook system can then provide the guest access link to a source of the request.

For example, in a class notebook, there is content for the teacher, content for student A, content for student B, and content for student C. The structure of the class notebook when stored at the file management system is that each student will see their own content only. Further, students A, B, and C will be able to see the common content, such as a collaboration space and a content library.

The guest access link can be created for a particular student's section group. Therefore, when a parent gets access to the class notebook, the parent will only be able to see the content of their student. For example, the parent of student A would only see the content of Student A and no other student's content. The guest access link allows a teacher to give access to a specific place within a class notebook that may otherwise be hidden.

A guest link can be an anonymous guest link that does not require authentication of a user. The guest link can be created by the file management system and is a link to access the content in the class notebook stored at the file management system. The class notebook system converts the guest link from the file management system to a guest access link. The guest access link is created by appending a flag (referred to as an online rendering flag) to the guest link provided by the file management system. The online rendering flag allows the content accessed by the guest link to be rendered in an online version of the class notebook application.

APIs for creating permission groups for a collaboration space are provided. A post permission API is provided that creates or updates the permission for a section group. In some cases, in response to receiving a request to post a permission for the section group, the class notebook system can communicate with a file management system to create or update the permission for the section group. The request can include a section group identifier, a user identifier, and a type of the permission.

A get permission API is provided that retrieves permission information of a section group. In some cases, in response to receiving a request to get a permission for the section group, the class notebook system can communicate with the file management system to receive the permission for the section group. The request can include the section group identifier and a permission object.

A delete permission API is provided that removes permission for a user of a section group. In some cases, in response to receiving a request to delete a permission for the section group, the class notebook system can communicate with the file management system to delete the permission for the section group. The request can include the section group identifier and a permission identifier.

A notebook application like Microsoft OneNote® utilizes a structure in which a notebook includes pages of content organized into sections, which are further organized into groups (referred to as section groups) within the notebook. A teacher can have a class notebook. Then, instead of using separate notebooks for each student, the students can be assigned a section group of the teacher's class notebook. Advantageously, this may reduce synchronization issues with managing multiple notebooks and can positively affect how the content is stored and managed.

However, because a class notebook of the class notebook application is "owned" by the primary user (the teacher), sharing section groups of the notebook with different access permissions as well as specifying access for other people to the class notebook as a whole is challenging. For example, conceptually for a class notebook application, it is desirable to provide the teacher access to each student's notebook while providing the students access to only their notebook (and not another student's notebook). Thus, where student notebooks are actually section groups of a teacher's class notebook, it is desirable to provide the teacher access to each student's section group and to provide the students access to only their section group. In addition, the teacher and all of the students should have read/write access to any collaboration space.

A file management system refers to a document management and storage system, such as Microsoft SharePoint®, Microsoft OneDrive® for Business, Google Drive®, and Citrix ShareFile®.

FIG. 1 shows a structure for a class notebook stored at a file management system and a structure for a class notebook stored at a class notebook system for an example implementation. Referring to FIG. 1, the structure for a notebook stored in the class notebook application, such as Microsoft OneNote®, includes a notebook 105. Inside the notebook 105, there are one or more section groups 110 (e.g., section group 110A, section group 110B, section group 110C, and section group 110D). Inside of the section groups 110, there are one or more sections 115 (e.g., section 115A, section 115B, and section 115C).

In the example provided in FIG. 1, the section group 110A includes the section group 110D and the section 115A. Further, the section group 110D includes the section 115B and the section 115C.

A notebook in a file management system, such as Microsoft SharePoint®, is stored differently from a notebook in the class notebook system, such as Microsoft OneNote®. In the file management system, there is a root folder 120. Inside the root folder 120 there are one or more folders 125 (folder 125A, folder 125B, and folder 125C). Inside the folders there one or more sub-folders 130 and/or files 135.

In the example provided in FIG. 1, the root folder 120 includes folder 125A, folder 125B, and folder 125C. Folder 125A includes sub-folder 130 and file 135A. Further, the sub-folder 130 includes the file 135B and the file 135C.

Therefore, the root folder 120 stores the notebook 105; the folders (125 and 130) store section groups 110; and the files 135 store sections 115.

The file management system only exposes sharing on the root folder 120. Therefore, in some implementations, the folders (125 and 130) and the files 135 are hidden. The described APIs conceptually allow the class notebook system language to be matched to the file management system language (e.g., reference to section group is understood by the class notebook system to be a folder) and the internal section groups (which are normally hidden) to be exposed.

Figure 2:
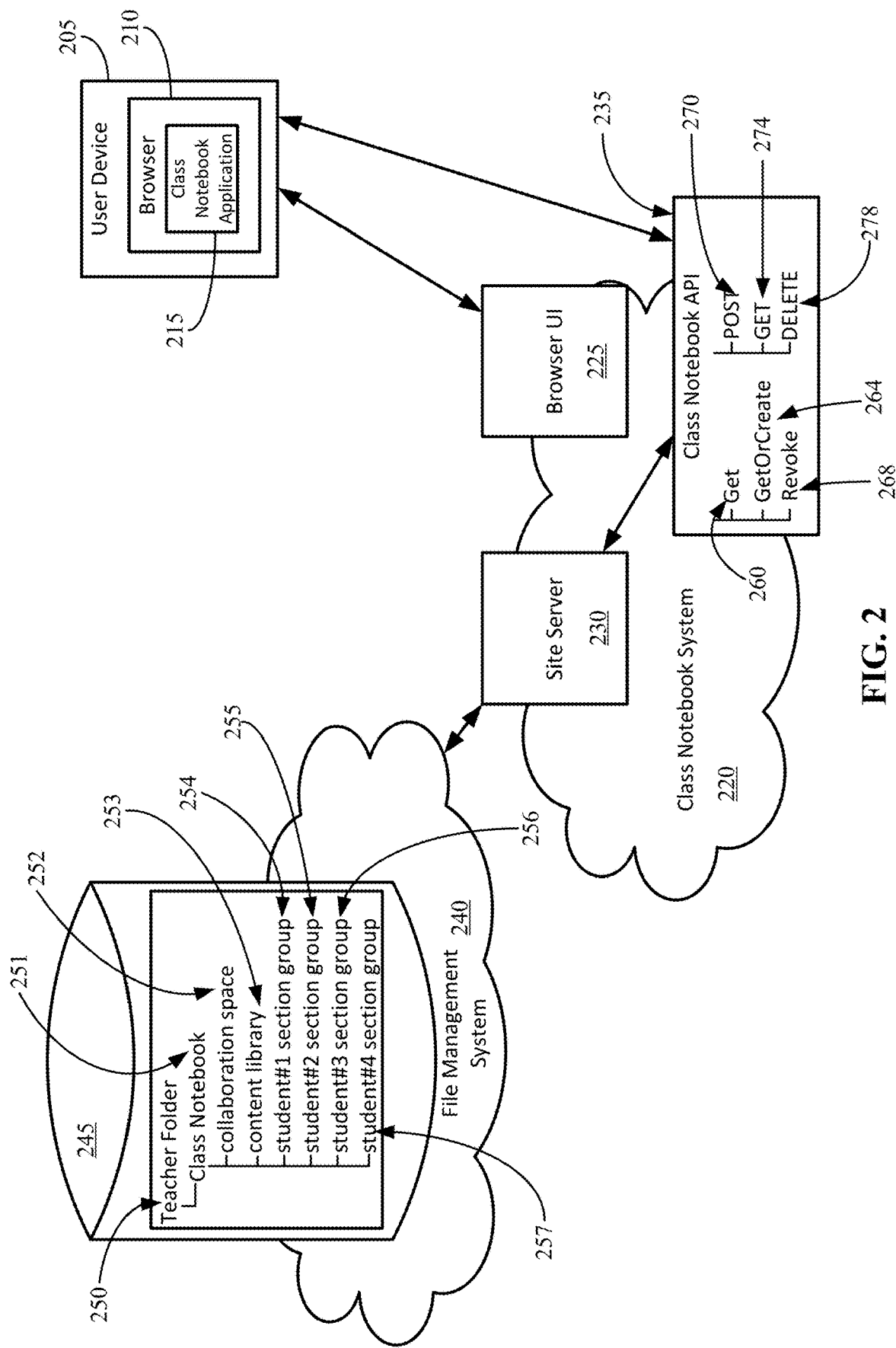
FIG. 2 shows an example operating environment in which an implementation may be carried out.
Figure 3:
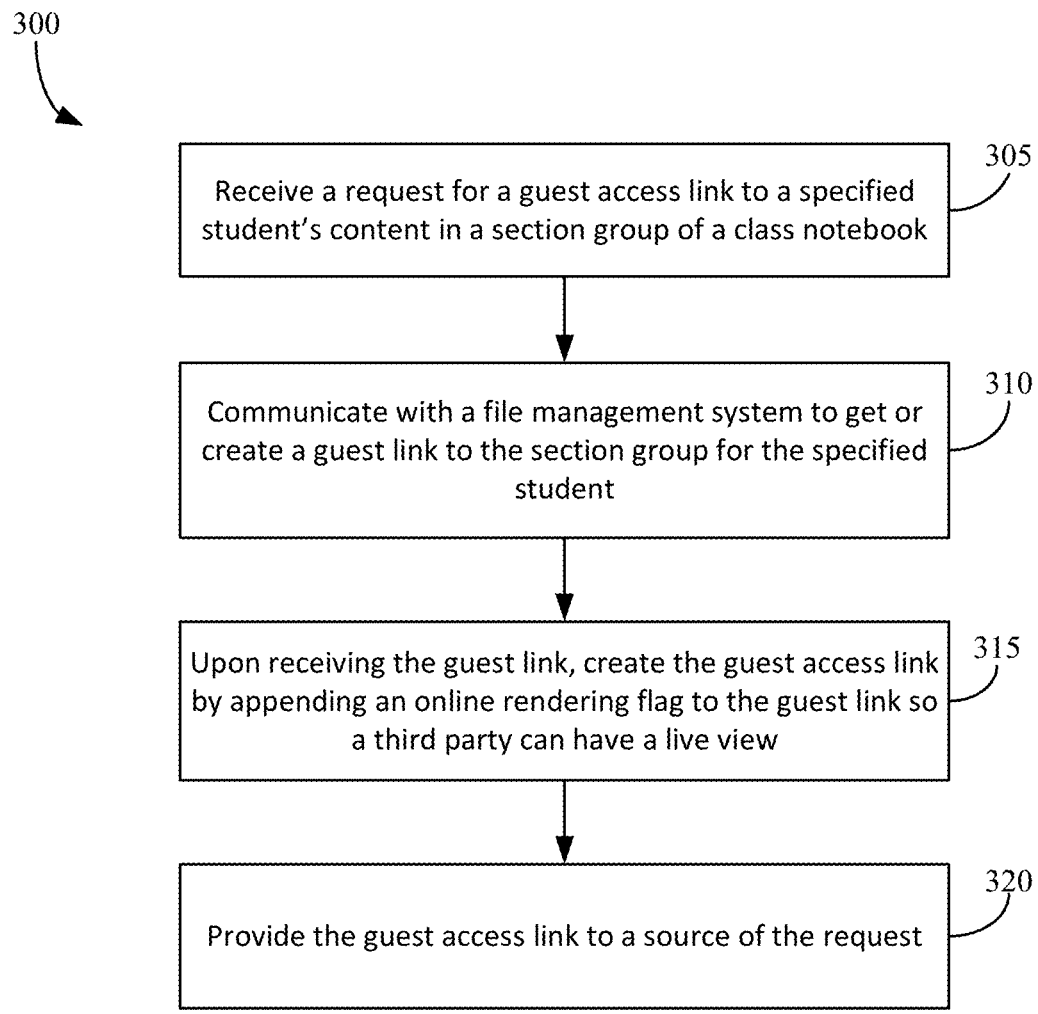
FIG. 3 shows an example process flow in which an implementation may be carried out.

FIG. 2 shows an example operating environment in which an implementation may be carried out; FIG. 3 shows an example process flow in which an implementation may be carried out; and FIG. 4 shows an example process flow in which an implementation may be carried out.

Referring to FIG. 2, the example operating environment may include a user device 205, a class notebook system 220 with a browser user interface (UI) 225, a site server 230, and a class notebook API 235, and a file management system 240 with a storage server 245.

Figure 4:
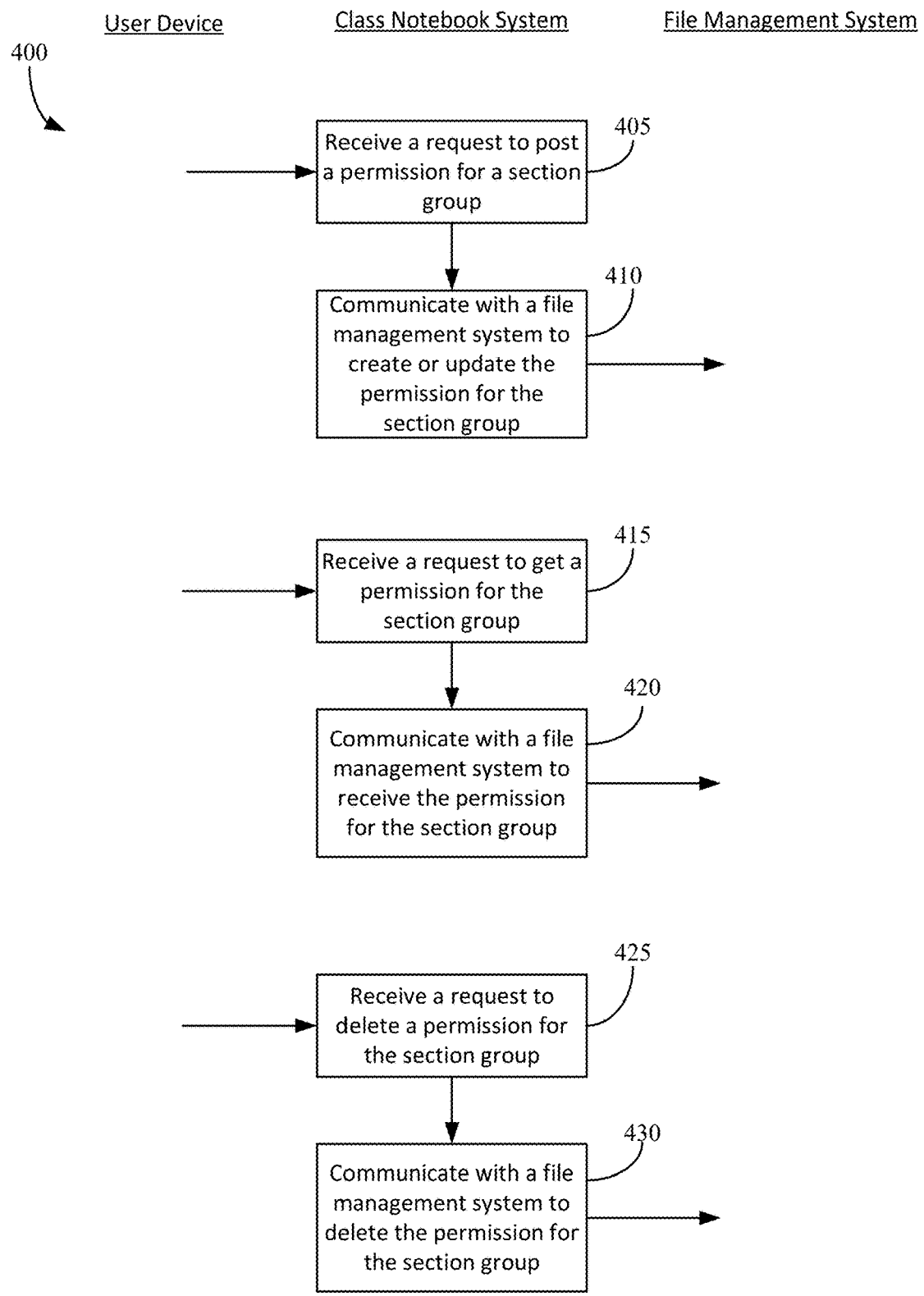
FIG. 4 shows an example process flow in which an implementation may be carried out.
Figure 12:
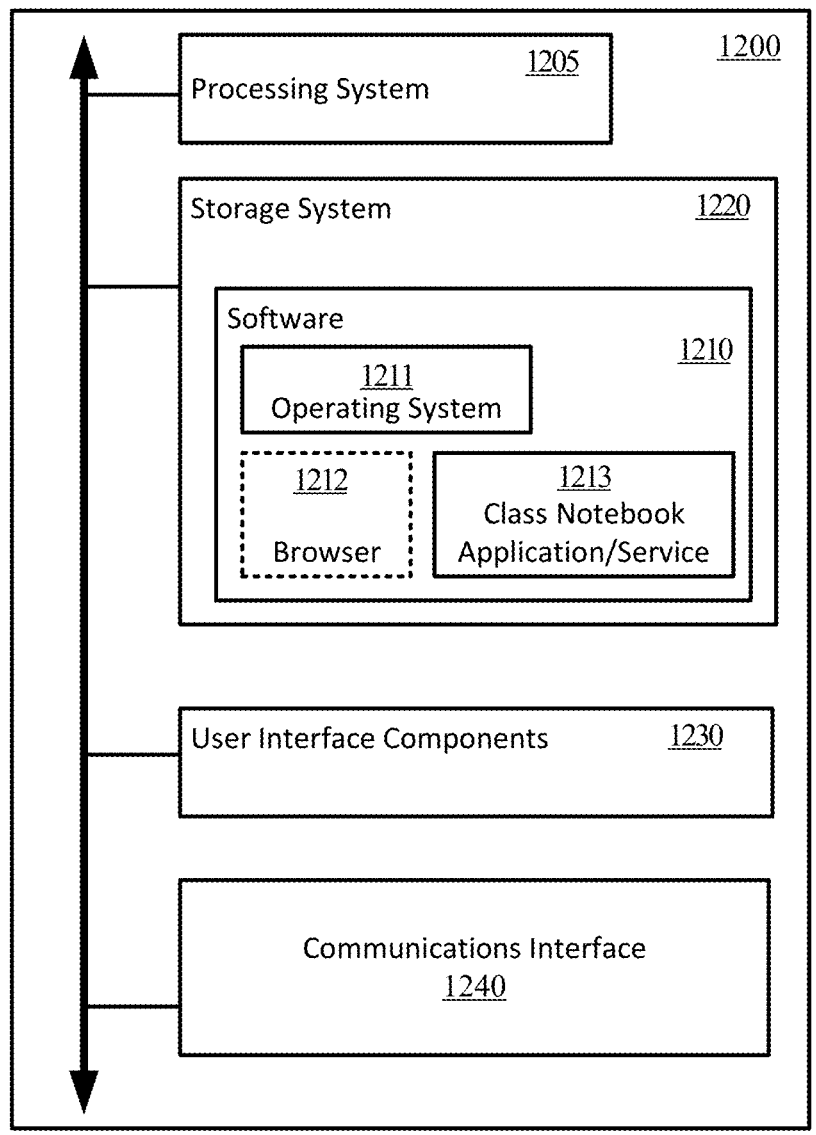
FIG. 12 is a block diagram illustrating components of a computing device or system that may be used to carry out some of the processes described herein.

The site server 230 may perform one or more of processes 300 and 400 described with respect for FIGS. 3 and 4, respectively, can be implemented by a system which can be embodied as described with respect to computing system 1200 as shown in FIG. 12.

The user device 205 may be a general-purpose device (of which system 1200 described with respect to FIG. 12 is representative) that has the ability to run one or more applications. The user device 205 may be, but is not limited to, a personal computer, a tablet computer, a reader, a mobile device, a personal digital assistant, a wearable computer, a smartphone, a laptop computer (notebook or netbook), a gaming device or console, a desktop computer, or a smart television.

In certain implementations, the class notebook application 215 is executed on the browser 210 at the user device 205. In some cases, the class notebook application 215 is a standalone application at a user device, such as user device 205. The class notebook application 215 enables a user of the user device 205 to view and edit content stored at a server, such as the site server 230 and the storage server 245. The class notebook application 215 retrieves content from the server(s) 230, 245 and makes calls to the server 230 through application programming interfaces, such as class notebook API 235.

The class notebook application 215 can communicate with site server 230, for example a cloud service or designated server, to retrieve and update content stored at a storage server (or servers) 245. The site server 230 and the storage server 245 may be a same computing system, a distributed computing system, and/or separate systems that communicate with each other. The site server 230 can manage the content at the storage server 245 and can, in some cases, enable collaboration with respect to the content. For example, the site server 230 can be a Microsoft SharePoint® server that serves an organization to which a teacher, students, and co-teacher(s) belong. That is, class notebooks can be stored associated with a teacher's personal folder in a cloud storage service, collaboration and management platform (such as Microsoft SharePoint®) or an enterprise system. The teacher can then access the class notebook and interact with it according to any of the features of the class notebook application 215.

The storage server 245 may store a teacher folder 250. The teacher folder 250 may be the personal folder of a user, such as a teacher. The teacher may create a class notebook 251 for each of the teacher's classes. The class notebook 251 can be stored in the teacher folder 250. Section groups (e.g., sub-folders) can then be created under the class notebook 251. For example, the class notebook 251 can have one section group identified as a collaboration space 252 and another section group identified as a content library 253. In addition, section groups can be created for each student in the class. For example, a first student section group 254, a second student section group 255, a third student section group 256, and a fourth student section group 257 may be created.

Referring to FIG. 2 and FIG. 3, the class notebook system 220 can receive a request for a guest access link to a specified student's content in a section group of a class notebook (305). The class notebook system 220 can receive the request from the user device 205, when a user calls the browser UI 225 from the user device 205.

In some implementations, the section group for the specified student is a hidden folder that includes one or more files. Each student in the class is assigned a corresponding section group.

The guest access link allows a user, such as a teacher, to share the section group of the specific student with an end user, for example, a parent or guardian. The end user can be given access to only the specified section group and not the rest of the content included in class notebook 251. The guest access link is an anonymous guest link and does not require authentication to access the content in the class notebook provided by the link. The guest access link allows the end user to be able to access content within the class notebook without having to log in, be an administrator, or belong to the community.

The class notebook system 220 can host the class notebook API 235, which includes multiple APIs. The class notebook system 220 can call one of the multiple API functions in the class notebook API 235 to communicate with the file management system 240 to manipulate the section groups and create a guest link.

The class notebook system 220 can communicate with the file management system 240 to get or create a guest link to the section group for the specified student (310). The class notebook system 220 can call an API function from the class notebook API 235 to communicate with the file management system 240.

The guest link is a link to the section group of the specified student that is stored on the storage server 245 at the file management system 240. The guest link can pass a gate of authentication in the file management system 240. Therefore, the guest link allows three-way access to the content in the file management system 240. Three-way access means that there is no restriction and a user can view the content. Through the class notebook API 235 the class notebook system 220 can communicate the necessary information to the file management system 240.

In some cases, the class notebook system 220 will first make a call to get the guest link. The class notebook system 220 can call a get guest link API 260. The get guest link API 260 gets a guest link from the file management system 240 which can be used to access the class notebook without needing to authenticate.

As previously described, each section group has an ID and each student has their own section group. Therefore, each student has their own ID. The browser UI 225 can retrieve the ID for each of section groups for each of the students and communicate the ID to the site server 230. The ID for the section group of the specified student can be included in the get guest link API 260 function.

If the guest link exists, the class notebook system 220 can receive the guest link from the file management system 240. If the guest link does not exist, the class notebook system 220 can receive an indication that the guest link does not exist.

In response to receiving the indication that the guest link does not exist, the class notebook system 220 can request to create the guest link. In this case, the class notebook system 220 can call a get or create API 264 on that section group. The get or create API 264 gets or creates an anonymous link which can be used to access the section group without needing to authenticate. Similar to the get guest link API 260 function, the get or create API 264 function includes the section group ID for the specified student. The class notebook system 220 can then receive the guest link from the file management system 240.

Upon receiving the guest link, the class notebook system 220 creates the guest access link by appending an online rendering flag to the guest link so a third party can have a live view (315). Then the class notebook system 220 provides the guest access link to a source of the request (320). The online rendering flag is appended to the initial guest link received from the file management system 240 and is a property that indicates that the content accessed via the guest link should be rendered in an online version of the class notebook application 215. Therefore, the end user, such as the parent, can then view the section group of the specified student through the online class notebook application. Usually, the online version of the class notebook application 215 would render the whole class notebook, but the guest access link renders only the specified piece of the class notebook and none of the others.

In some cases, the class notebook system 220 can receive, from the user device 205, a request to revoke the guest access link to the section group of the specified student. The class notebook system 220 can then communicate with the file management system 240 to remove the guest link. To remove the guest link, the class notebook system 220 can call revoke guest link API 268 of the class notebook API 235. The revoke guest link API 268 revokes an existing guest link for the section group. Like the get guest link API 260 and the get or create guest link API 264, the section group ID is communicated with the revoke guest link API 268 function. The revoke guest link API 268 will disable the guest link for the specified section group.

Once the guest link has been revoked, the guest link will no longer exist. Therefore, if there is a request for a guest access link to that same section group, the class notebook system 220 will have to call the get or create guest link API 264 to create a new guest access link.

The user may decide to remove the guest access link for several reasons. For example, the user may decide to remove the guest access link of there is a change in guardianship and an end user should no longer have access to the guest access link.

Referring to FIG. 2 and FIG. 4, the class notebook system 220 can receive a request to post a permission for a section group of a class notebook (405). The class notebook system 220 can receive the request from the user device 205, when a user calls the browser UI 225 from the user device 205.

The request to post the permission for the section group can include multiple parameters, such as a section group identifier, a user identifier, and a type of permission. In some cases, the user identifier may be the login of the user or group to assign the permission to. The type of permission may include, for example, owner, contributor, or reader.

In some cases, only one permission may be created or updated per request. The permissions may be applied to all class notebook entities down an inheritance chain. In some cases, a permission may be updated to grant more permissive access.

In response to receiving the request to post the permission (405), the class notebook system 220 can communicate with the file management system 240 to create or update the permission for the section group (410). In this case, the class notebook system 220 can send a POST API 270 to communicate the received parameters to the file management system 220 to create or update the permission for the section group.

In another case, the class notebook system 220 can receive a request to get a permission for the section group of the class notebook (415). The class notebook system 220 can receive the request from the user device 205, when a user calls the browser UI 225 from the user device 205.

The request to get the permission for the section group can include multiple parameters, such as a section group identifier and a permission object. The permission object may include a display name of the user, a permission identifier, a URL of the permission object, a user identifier, and a type of permission. In some cases, the user identifier may be the login of the user or group to assign the permission to. The type of permission may include, for example, owner, contributor, or reader. A reader permission can include read-only access to the section group. A user with a contributor permission can add, edit, and delete the section group. A user with an owner permission can have all the permissions of a reader permission and a contributor permission and can also manage permissions. Managing permissions may include getting permissions, creating permissions, and deleting permissions.

In some cases, the request to get the permission for the section group may be to get a specific permission for a section group.

In response to receiving the request to post the permission (415), the class notebook system 220 can communicate with the file management system 240 to get the permission for the section group (420). In this case, the class notebook system 220 can call a GET API 274 to communicate the received parameters to the file management system 240 to get the permission for the section group. In some cases, the get request can return the highest permission for a user role of the section group.

In yet another case, the class notebook system 220 can receive a request to delete a permission for the section group of the class notebook (425). The class notebook system 220 can receive the request from the user device 205, when a user calls the browser UI 225 from the user device 205.

The request to delete the permission for the section group can include multiple parameters, such as a section group identifier and a permission identifier. In some cases, only one permission may be deleted per request.

In response to receiving the request to post the permission (425), the class notebook system 220 can communicate with the file management system 240 to delete the permission for the section group (430). In this case, the class notebook system 220 can call a DELETE API 278 to communicate the received parameters to the file management system 240 to delete the permission for the section group. In some cases, when a permission is deleted, the permission is deleted from all the class notebook entities down an inheritance chain.

Example implementations of process 400 can include creating a teacher only section group, creating a lockdown of the collaboration space, creating permissioned groups within the collaboration space, and creating custom permissions for feedback and grading workflows.

A teacher only section group is a private space where only the teacher can see the included content. The students are not able to see the content in the teacher only section group.

A collaboration space lockdown allows for a teacher to make the collaboration space section group read-only (or lockdown) to disallow any students from editing the content.

The described APIs allow for the lockdown of the collaboration space as read-only, but also the ability to easily unlock the collaboration space.

Creating permissioned groups within the collaboration space section group allows a teacher to create specific sections in the collaboration space that are assigned to specific students. This can allow small groups of students to work together, but other students cannot change what other groups have done. Creating permissioned groups within the collaboration space also allows sections to be completely hidden from other groups.

An example of creating permissioned groups within the collaboration space can include creating four groups of six students each. Each group of the students is assigned to a specific section. Each student in Group 1 can co-author in the Group 1 section, but cannot edit any content in the Group 2, Group 3, or Group 4 sections.

Another example of creating permissioned groups within the collaboration space can include creating four groups of six students each. Each group of the students is assigned to a specific section. Each student in Group 1 can co-author in the Group 1 section, but cannot read or edit any content in the Group 2, Group 3, or Group 4 sections.

Creating custom permissions for feedback and grading workflow includes allowing the lockdown of reviewed or graded pages of a class notebook.

To enable the managing of permissions to class notebooks, the class notebook application includes a mechanism to give access to content within the class notebook. For example, access to content in a section group for a specified student, where the section group is a hidden folder that includes one or more files. FIGS. 5A-5E illustrate an example graphical user interface for a teacher to create a guest access link for a content library. The graphical user interface is displayed on a teacher's user device running the class notebook application.

Figure 5A:
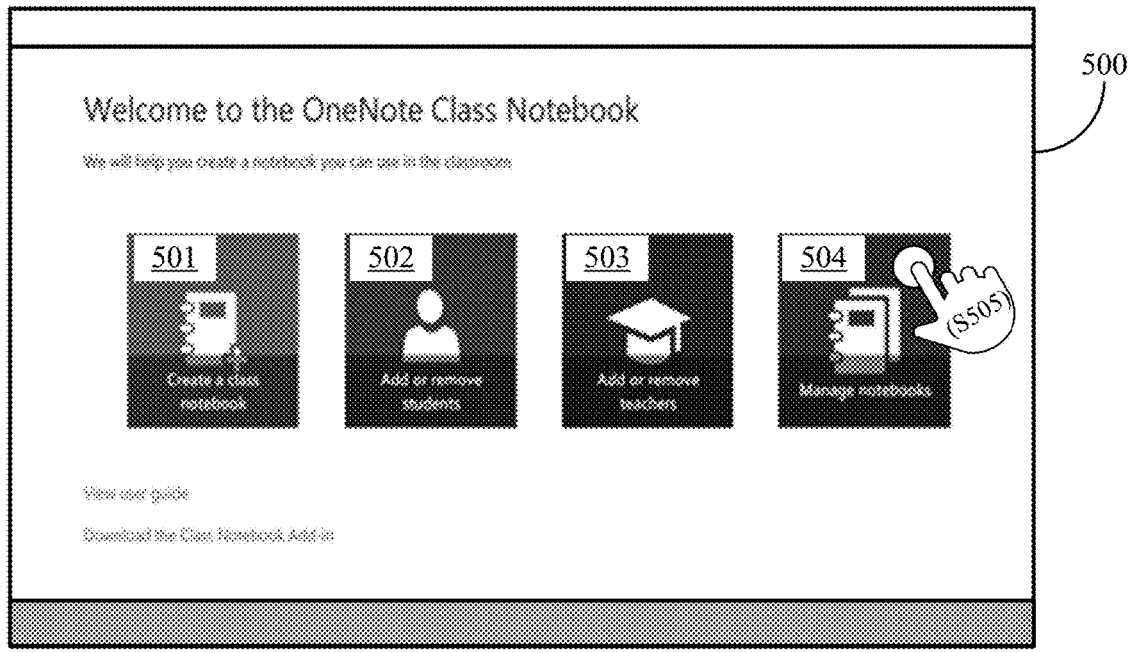
FIGS. 5A-5E illustrate an example graphical user interface for a teacher to create a guest access link for a content library.

Referring to FIG. 5A, the class notebook application can have a graphical user interface 500 providing icons representing tools such as "create a class notebook" 501, "add or remove students" 502, "add or remove teachers" 503, and "manage notebooks" 504. When a user selects (S505) the "manage notebooks" 503, the graphical user interface 500 responds with a workflow to obtain the information that the class notebook application needs to manage access to content in a class notebook.

Figure 5B:
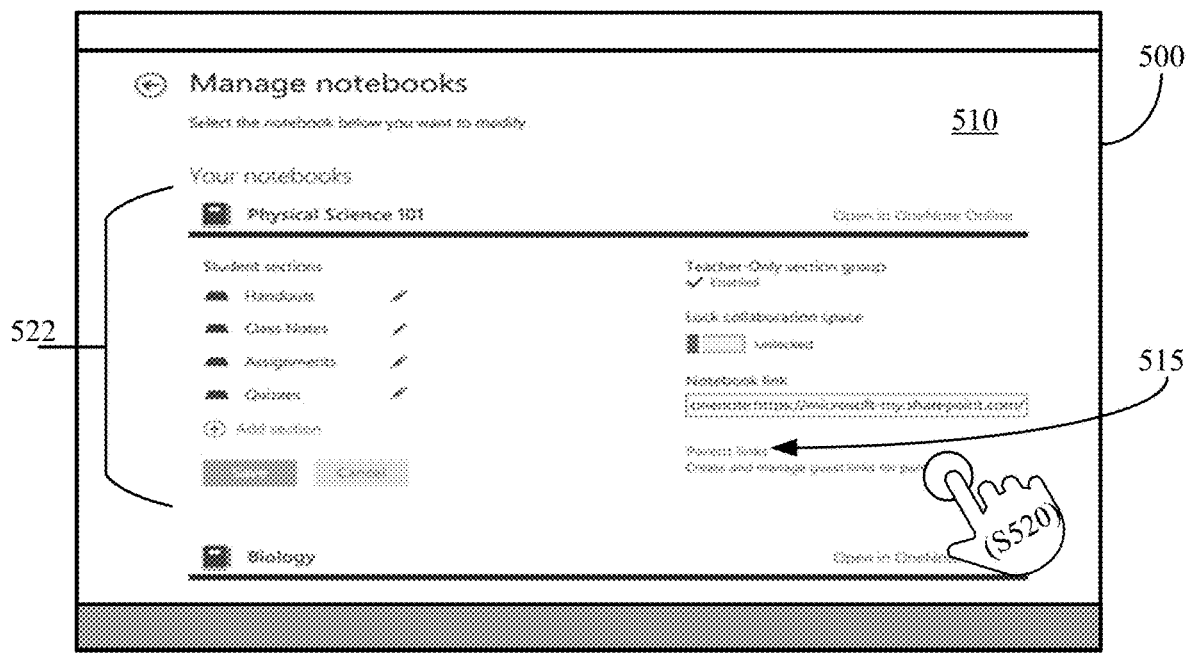

As part of the workflow, the class notebook application presents a manage notebooks view 510 through which a user can select the class notebook they want to modify, as illustrated in FIG. 5B. The manage notebooks view 510 provides the user with multiple commands to manage access to the content within each of their notebooks. For example, a "parent link" command 515 allows the user to request one or more guest access links for parents. In this case, the user selects (S520) the "parent link" command 515 for the selected class notebook, "Physical Science 101" 522.

Figure 5C:
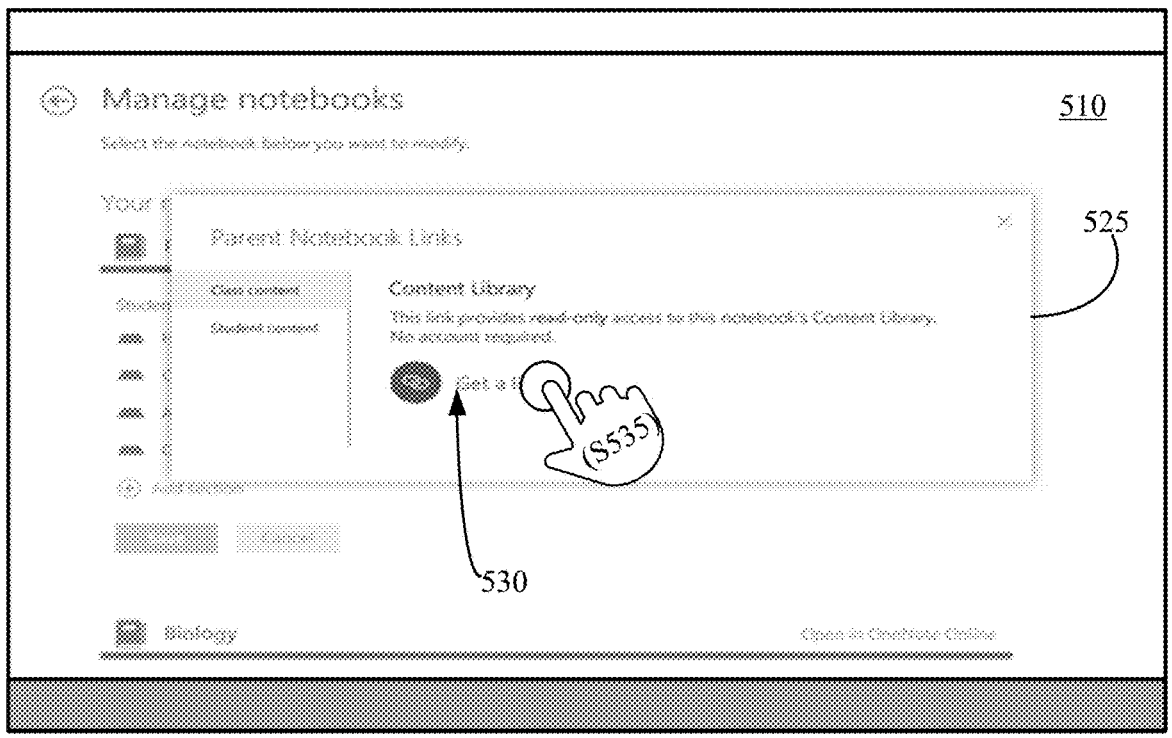

Referring to FIG. 5C, after the user selects (S520) the "parent link" command 515 (as shown in FIG. 5B), a parent notebook links window 525 is displayed in the manage notebooks view 510. The parent notebook links window 525 provides a get a link command 530 to request a guest access link to a content library in the class notebook. The guest access link can provide read-only access to the content library of the selected class notebook, "Physical Science 101" 522. In this example, the user selects (S535) the get a link command 530.

In some cases, the parent notebook links window 525 displays the get a link command 530 for the content library (class content) as a default. As will be discussed later, the user may create the guest link for student content.

Figure 5D:
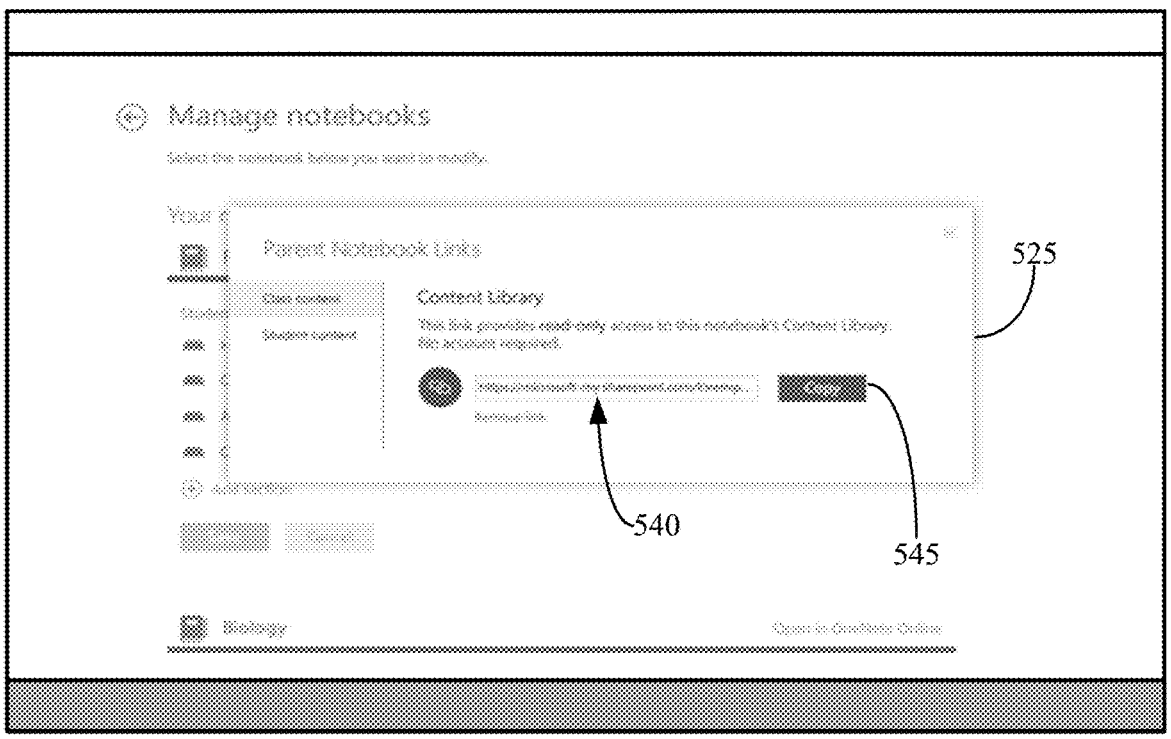

Referring to FIG. 5D, a guest access link 540 is created for the selected class notebook's content library and displayed in the parent notebook links window 525. A copy command 545 is provided that allows the user to copy the guest access link 540 and send it to an end user, such as a parent.

Figures 5E, 6:
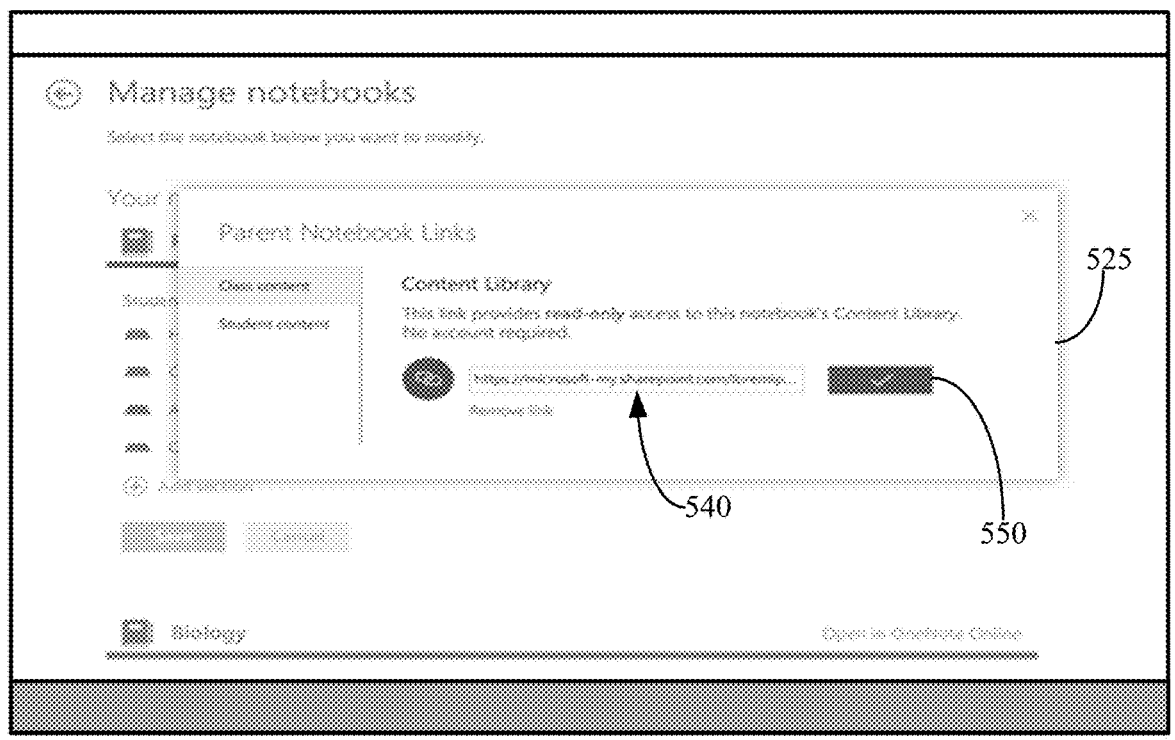
FIG. 6 illustrates an example graphical user interface displaying content an end user can view when accessing the guest access link for the content library.

Referring to FIG. 5E, once the copy command 545 (as shown in FIG. 5D) has been selected and the guest access link 540 copied, the parent notebook links window 525 can display a copied icon 550 in the place of the copy command 545. The copied icon 550 denotes the guest access link 540 has been copied.

FIG. 6 illustrates an example graphical user interface displaying content an end user can view when accessing the guest access link for the content library. Referring to FIG. 6, the end user, such as the parent, can receive the guest access link from the teacher. The end user does not have to provide authentication to access the class notebook application. Instead, the end user only needs to select the guest access link provided by the teacher. When the end user selects the link, the content of the content library for the "physical science 101 notebook" will be rendered in an online class notebook application. In this case, the content of the content library is rendered in Microsoft OneNote® Online.

Figure 7A:
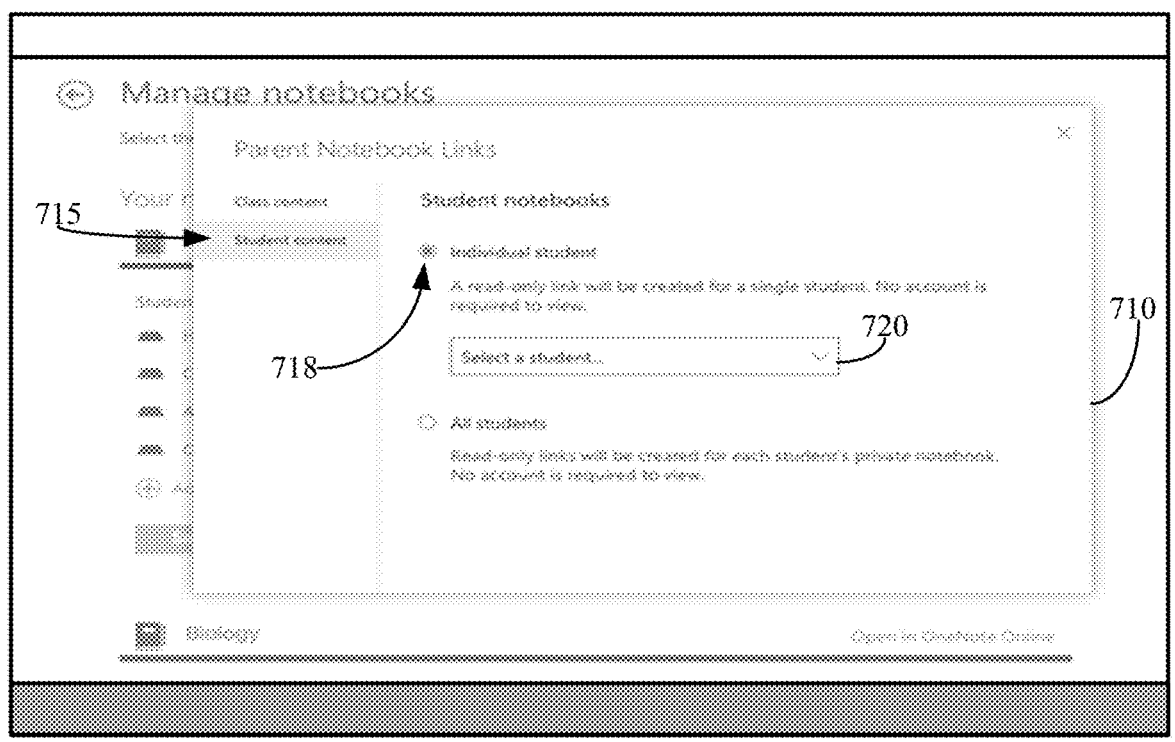
FIGS. 7A-7C illustrate an example graphical user interface for creating a guest access link for a section group of an individual student.
Figure 7B:
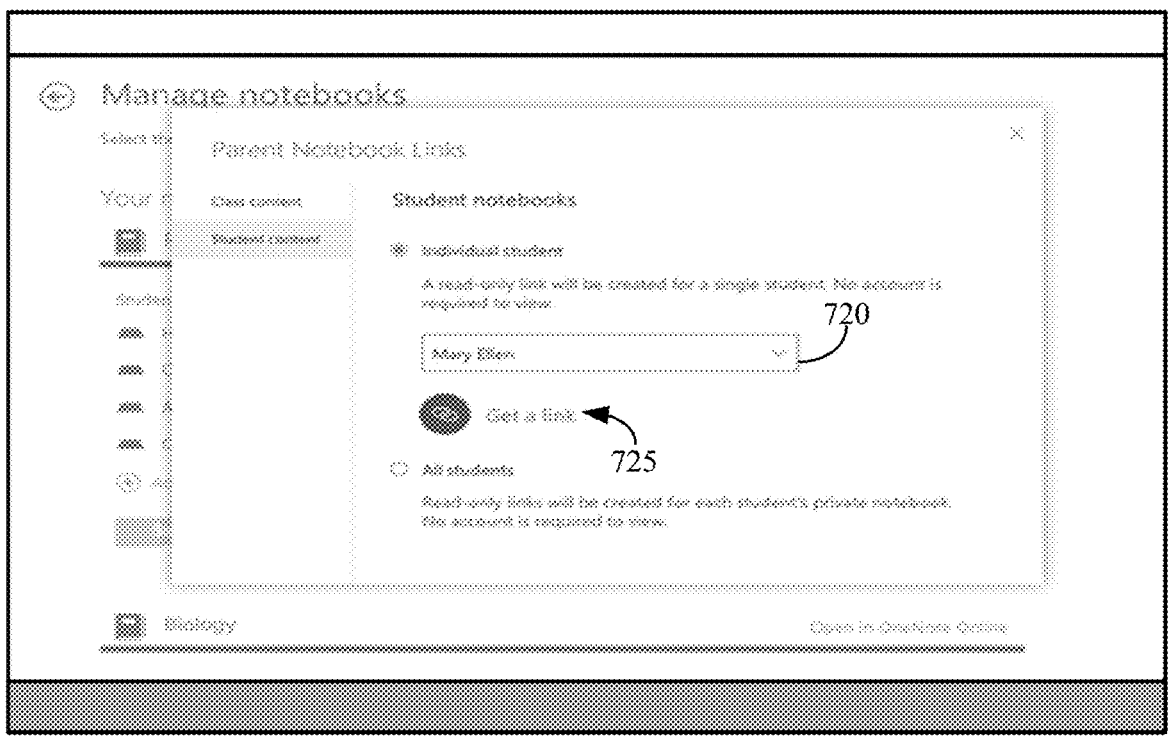
Figure 7C:
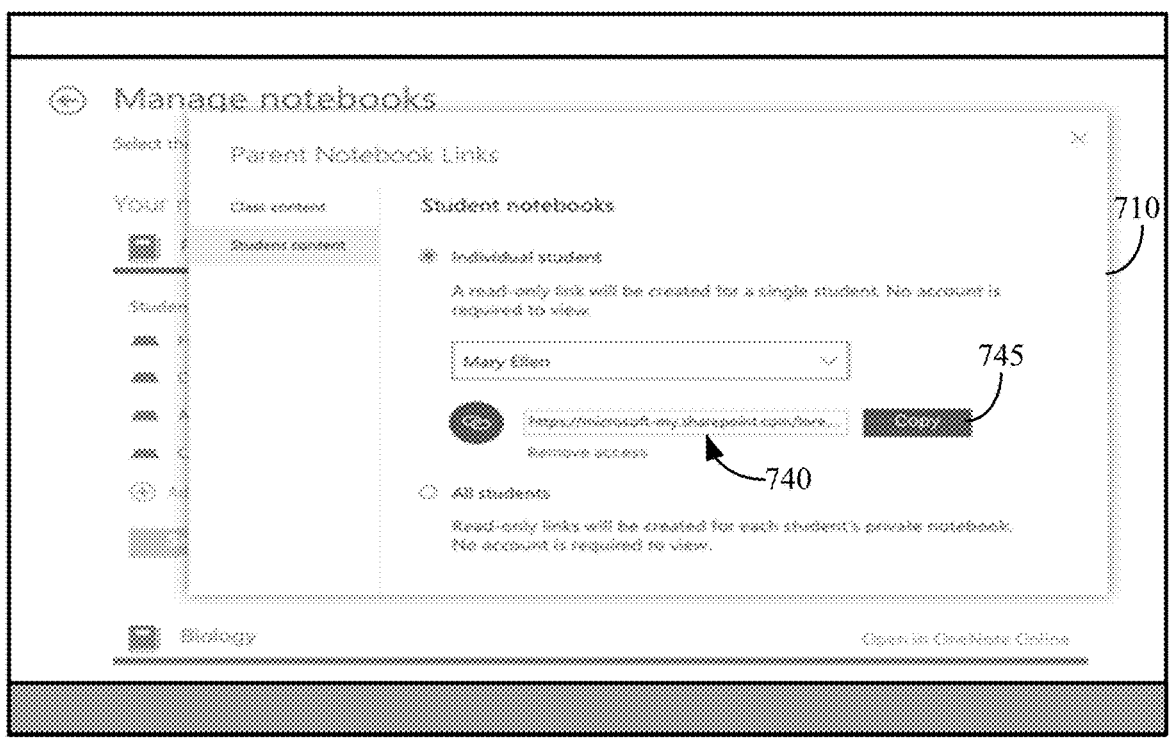

FIGS. 7A-7C illustrate an example graphical user interface for creating a guest access link for a section group of an individual student. Referring to FIG. 7A, the user may navigate to a parent notebook links window 710, via the same steps as provided in FIGS. 5A and 5B. While the parent notebook links window 710 is displayed, the user can select a student content tab 715 to manage access to content for either an individual student or for all students in the class notebook. In this example, the user selects an "individual student" icon 718 to create a guest access link for content for an individual student. The parent notebook links window 710 provides a drop-down menu 720 that allows the user to select the name student in which the guest access link will be created.

Referring to FIG. 7B, once a student is selected in the drop-down menu 720, a get a link command 725 can be displayed in the parent notebook links window 710. In this example, an individual student, "Mary Ellen," has been selected in the drop-down menu 720. The user can select the get a link command 725 to request a guest access link to the content for "Mary Ellen," such as the content in a section group for "Mary Ellen."

Referring to FIG. 7C, a guest access link 740 is created for the selected student's ("Mary Ellen") content and displayed in the parent notebook links window 710. A copy command 745 is provided that allows the user to copy the guest access link 740 and send it to an end user, such as a parent.

Figure 8A:
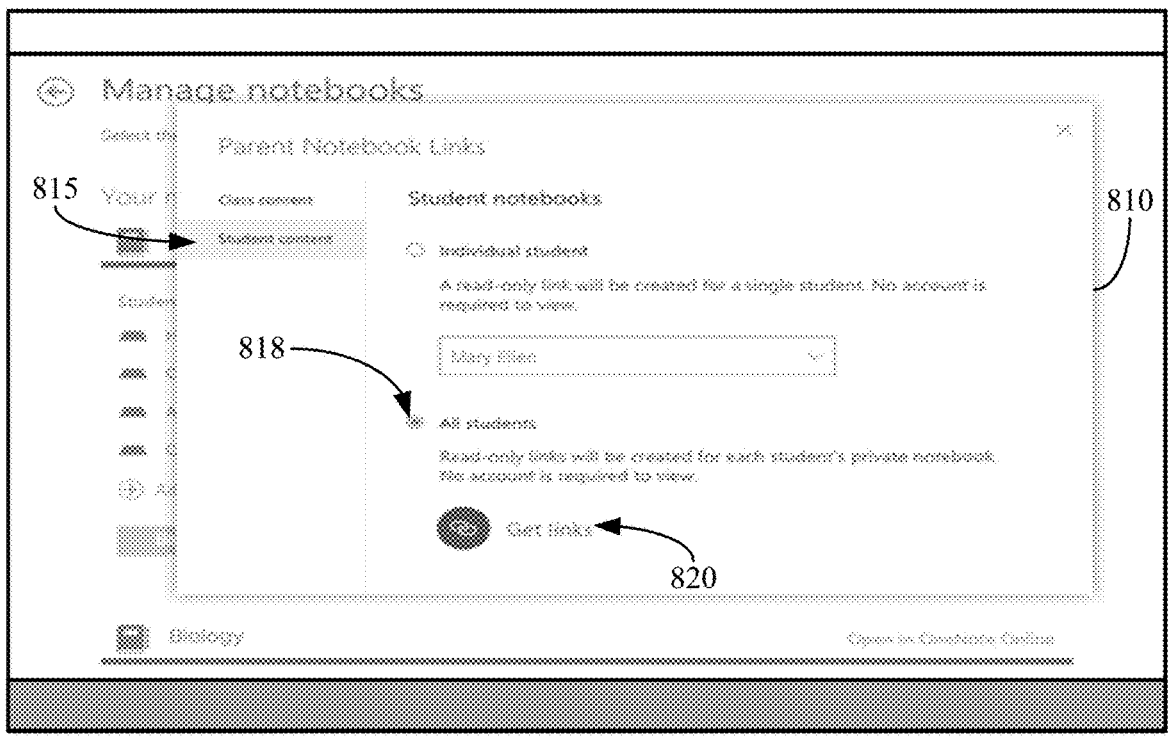
FIGS. 8A-8B illustrate an example graphical user interface for creating a guest access link for the section group of all the students.
Figure 8B:
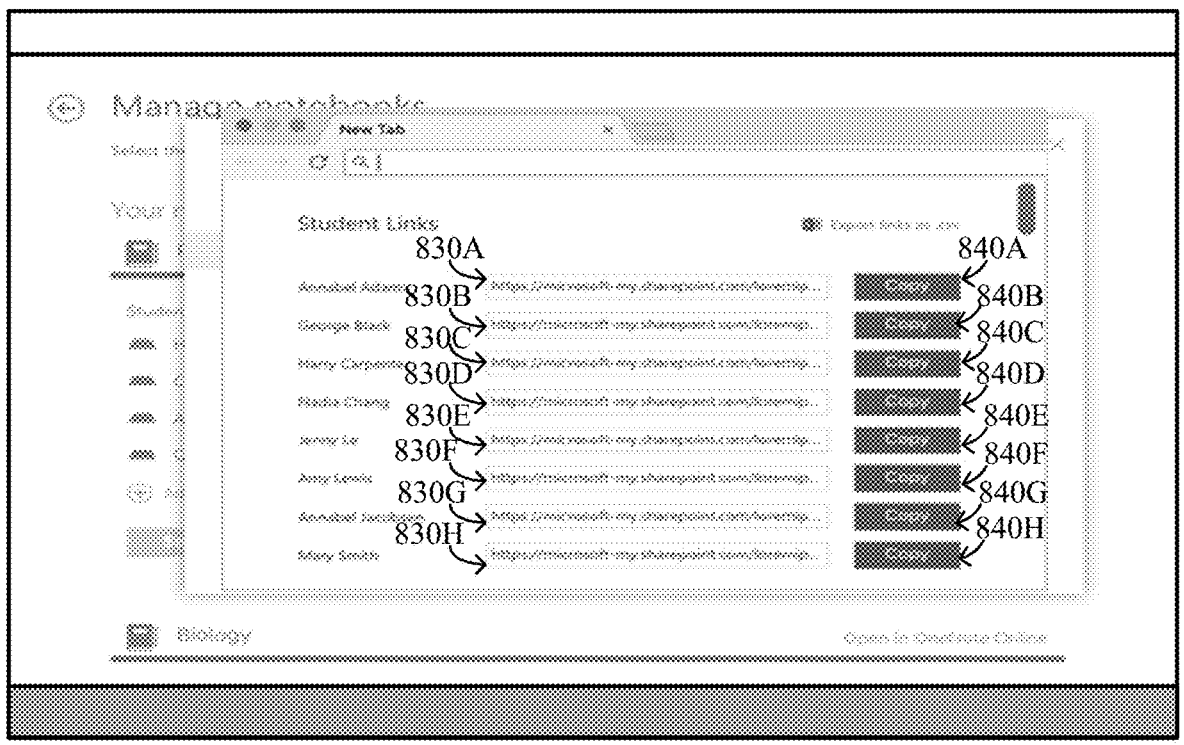

FIGS. 8A-8B illustrate an example graphical user interface for creating a guest access link for the section group of all the students. Referring to FIG. 8A, the user may navigate to a parent notebook links window 810, via the same steps as provided in FIGS. 5A and 5B. While the parent notebook links window 810 is displayed, the user can select a student content tab 815 to manage access to content for either an individual student or for all students in the class notebook. In this example, the user selects to create guest access links for all the students in the class notebook by selecting "all students" icon 818. When the "all students" icon 818 is selected, the parent notebook links window 810 can provide a get links command 820.

Referring to FIG. 8B, guest access links 830 are created for the content of each of the students in the class notebook. The teacher may select a copy command 840 to copy one of the guest access links 830 and send the guest access link 830 to one or more end users.

For example, the teacher may select the copy command 840A to copy the created guest access link 830A for student "Annabel Adams;" the teacher may select the copy command 840B to copy the created guest access link 830B for student "George Black;" the teacher may select the copy command 840C to copy the created guest access link 830C for student "Harry Carpenter;" the teacher may select the copy command 840D to copy the created guest access link 830D for student "Nadia Chang,"; the teacher may select the copy command 840E to copy the created guest access link 830E for student "Jenny Le;" the teacher may select the copy command 840F to copy the created guest access link 830F for student "Amy Lewis;" the teacher may select the copy command 840G to copy the created guest access link 830G for student "Annabel Jacobsen;" and the teacher may select the copy command 840H to copy the created guest access link 830H for student "Mary Smith."

Figure 9:
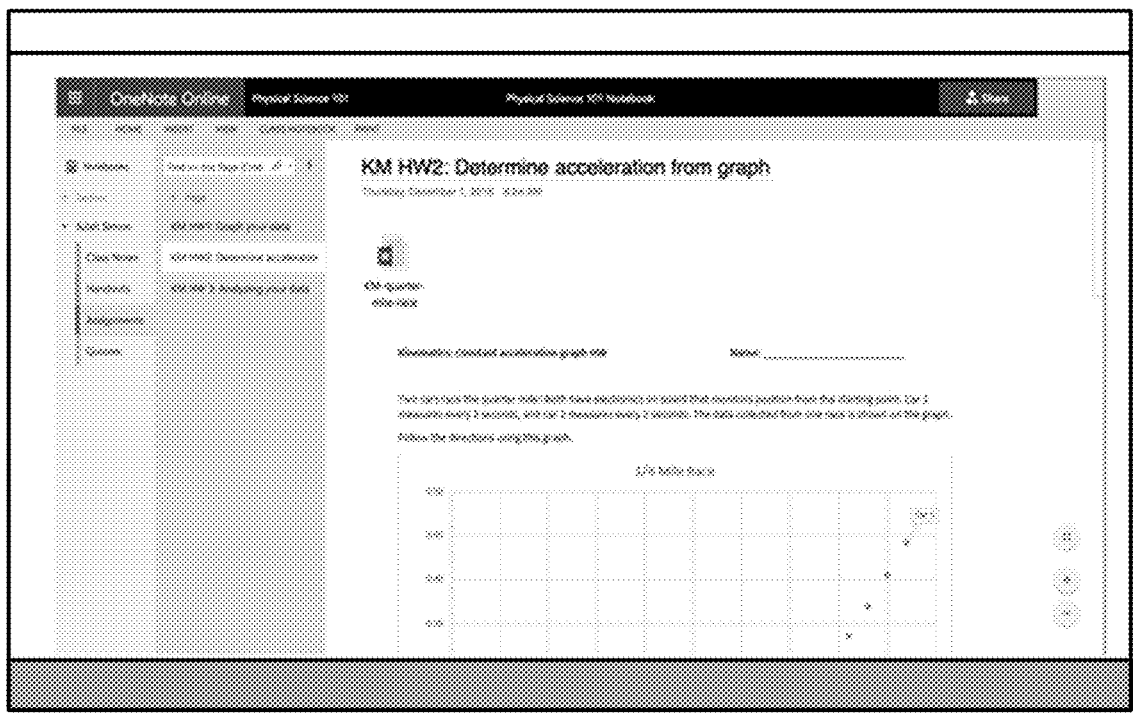
FIG. 9 illustrates an example graphical user interface displaying content an end user can view when accessing the guest access link for a student's section group.

FIG. 9 illustrates an example graphical user interface displaying content an end user can view when accessing the guest access link for a student's section group. Referring to FIG. 9, an end user, such as a parent, can receive a guest access link from a teacher. The end user does not have to provide authentication to access the class notebook application to view the content of the student's section group. Instead, the end user only needs to select the guest access link provided by the teacher. When the end user selects the guest access link, the content of the student's section group will be rendered in an online class notebook application. In this case, the content of the content library is rendered in Microsoft OneNote® Online. In some implementations, the guest access link allows the end user to access a hidden or otherwise internal folder (e.g., the section group). The hidden/internal folder contains the student's private content that only the teacher can view.

In some cases, the end user can view the content of the student's section group live. The browser renders the content that is at the location of the guest access link. Therefore, the user can view the content, as well as any updates. The browser can show as any typing, inking, or pictures are added.

Figure 10:
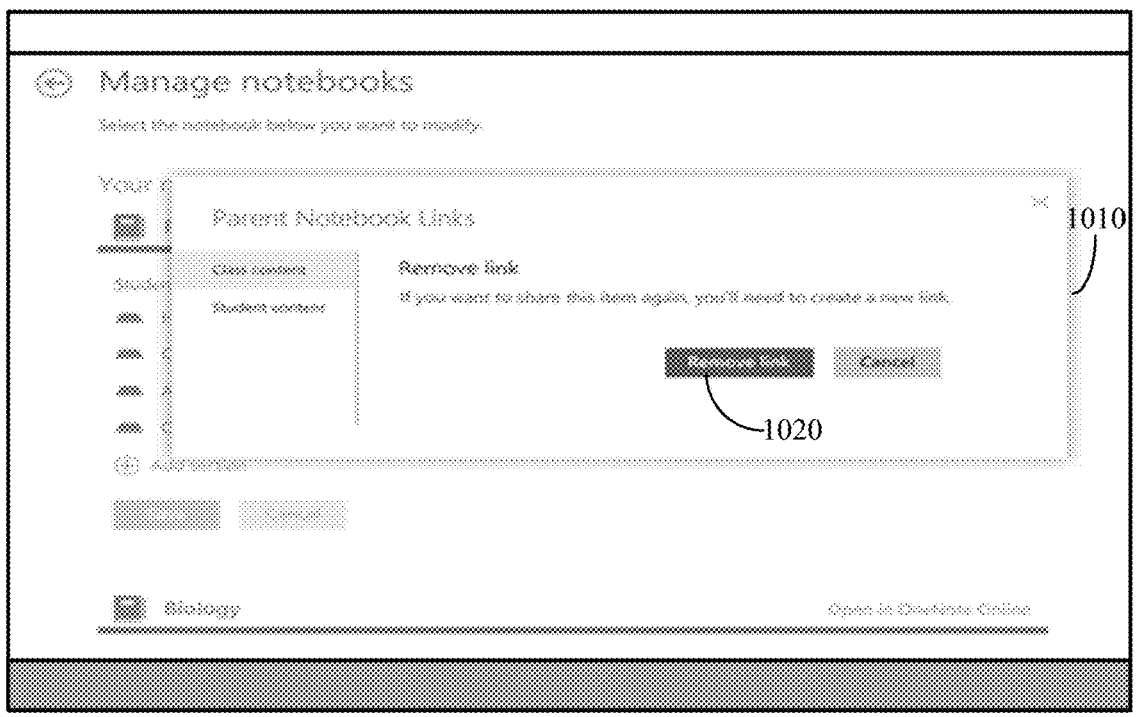
FIG. 10 illustrates an example graphical user interface for revoking a guest access link.

FIG. 10 illustrates an example graphical user interface for revoking a guest link. Referring to FIG. 10, the user may navigate to a parent notebook links window 1010, via the same steps as provided in FIGS. 5A and 5B. The parent notebooks link window 1010 may be displayed to the user with a remove link command 1020 that allows the user to remove a guest access link. The remove link command 1020 will disable the guest access link.

Figure 11:
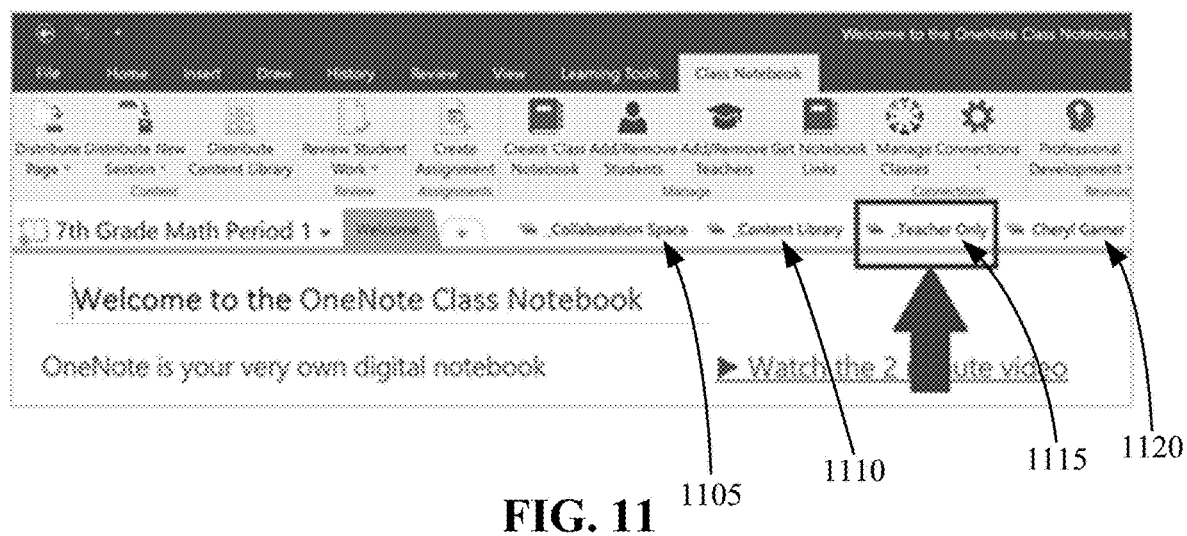
FIG. 11 illustrates an example graphical user interface of a class notebook that includes a teacher only section group.

FIG. 11 illustrates an example graphical user interface of a class notebook that includes a teacher only section group. Referring to FIG. 11, a user may create a teacher only section group in their class notebook. Similar to tabs for a collaboration space (e.g., collaboration space tab 1105), content library (e.g., content library tab 1110), and student section groups (e.g., student section group 1120), a teacher only tab 1115 may be provided in the class notebook.

FIG. 12 is a block diagram illustrating components of a computing device or system that may be used to carry out some of the processes described herein. Referring to FIG. 12, device 1200 may represent a computing device such as, but not limited to, a personal computer, a tablet computer, a reader, a mobile device, a personal digital assistant, a wearable computer, a smartphone, a laptop computer (notebook or netbook), a gaming device or console, a desktop computer, or a smart television. Device 1200 may alternatively represent one or more servers. Accordingly, more or fewer elements described with respect to device 1200 may be incorporated to implement a particular computing system.

Device 1200, for example, includes a processing system 1205 of one or more processors to transform or manipulate data according to the instructions of software 1210 stored on a storage system 1220. Examples of processors of the processing system 1205 include general purpose central processing units, graphic processing units (GPUs), application specific processors, and logic devices, as well as any other type of processing device, combinations, or variations thereof.

The software 1210 can include an operating system 1211 and application programs or components such as a web browser 1212 and a class notebook application or service 1213. Device operating systems 1211 generally control and coordinate the functions of the various components in the computing device 1200, providing an easier way for applications to connect with lower level interfaces like a communications/networking interface (1240). Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system 1211 may be implemented both natively on the computing device and on software virtualization layers running atop the native device operating system (OS). Virtualized OS layers, while not depicted in FIG. 12, can be thought of as additional, nested groupings within the operating system space, each containing an OS, application programs, and APIs.

Storage system 1220 includes any computer readable storage media readable by the processing system 1205 and capable of storing software 1210. Storage system 1220 may include volatile and nonvolatile memory, removable and non-removable media implemented in any method or technology for storage of information. Examples of storage media include random access memory (RAM), read only memory (ROM), magnetic disks, optical disks, CDs, DVDs, flash memory, solid state memory, phase change memory, or any other suitable storage media. In no case do storage media consist of a transitory propagated signal or carrier wave. In addition to storage media, in some implementations, storage system 1220 may also include communication media over which software may be communicated internally or externally.

Storage system 1220 may be implemented as a single storage device but may also be implemented across multiple storage devices or sub-systems co-located or distributed relative to each other. Storage system 1220 may include additional elements, such as a controller, capable of communicating with processing system 1205.

Software 1210 may be implemented in program instructions and among other functions may, when executed by device 1200 in general or processing system 1205 in particular, direct device 1200 or the one or more processors of processing system 1205 to operate as described herein for managing APIs for access to content in class notebooks and their section groups in a notebook application and/or for supporting a class notebook or web browser for access to an online note book or viewer.

The system can further include user interface components 1230. User interface components 1230 can include input devices such as a camera, a microphone, a touch device, a motion input device, and other user interface components including input devices such as a keyboard or mouse. User interface components 1230 can also include output devices such as display screens, speakers, or haptic devices for tactile feedback. In certain cases, the input and output devices may be combined in a single device, such as a touchscreen display which both depicts images and receives touch gesture input from the user.

User interface components 1230 may also include user interface software and associated software (e.g., for graphics chips and input devices) executed by the OS in support of the various user input and output devices. The associated software assists the OS in communicating user interface hardware events to application programs using defined mechanisms. The user interface components 1230 including user interface software may support a graphical user interface, a natural user interface, or any other type of user interface.

A communication interface 1240 is included, providing communication connections and devices that allow for communication between device 1200 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface are controlled by the OS 1211, which informs applications and APIs of communications events when necessary.

It should be noted that certain elements of device 1200 may be included in a system-on-a-chip (SoC) device. These elements may include, but are not limited to, the processing system 1205, elements of the storage system 1220, and even elements of the communications interface 1240.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Content accessed by the class notebook application 1213 may be stored on any number of remote storage platforms (not shown) that may be accessed by the device 1200 over communication networks (not shown) via the communications interface 1240. Such remote storage providers might include, for example, a server computer in a distributed computing network or an enterprise network. They may also include "cloud storage providers" whose data and functionality are accessible to applications through OS functions or APIs. In a specific example described herein, the class notebook application 1213 communicates with a Microsoft SharePoint® server (associated with a remote storage provider) through APIs.

What is claimed is:

1. A method for managing permissions to content in a class notebook comprising:
   receiving, at a class notebook system, a request for a guest access link to a specified student's content in a section group of a class notebook, the specified student's content in the section group being a specific page within the class notebook;
   communicating with a file management system to get or create a guest link to the specified student's content in the section group;
   upon receiving the guest link, creating, at the class notebook system, the guest access link by appending an online rendering flag to the guest link so a third party can have a live view; and
   providing the guest access link to a source of the request, the guest access link providing access to only the specific page within the class notebook without providing permissions to any other content in the class notebook.

2. The method of claim 1, further comprising:
   in response to receiving a request to revoke the guest access link to the specified student's content in the section group, communicating with the file management system to remove the guest link.

3. The method of claim 1, wherein communicating with the file management system comprises:
   requesting to get the guest link to the specified student's content in the section group; and
   receiving the guest link or an indication that the guest link does not exist.

4. The method of claim 3, further comprising:
   in response to receiving the indication that the guest link does not exist, requesting to create the guest link; and
   receiving the guest link.

5. The method of claim 1, wherein communicating with the file management system includes communicating a section group identifier.

6. The method of claim 1, wherein the guest access link grants a read-only permission.

7. The method of claim 1, wherein the guest access link grants an editing permission.

8. A method for managing permissions in a class notebook comprising a plurality of section groups including a collaboration section group, a content library section group, and a plurality of student-specific section groups, the method comprising:
   in response to receiving, at a class notebook system, a request to post a permission for a section group of the class notebook, communicating with a file management system to create or update the permission for the section group,
      the request comprising a section group identifier, a user identifier, and a type of the permission, and
      the section group of the class notebook being a specific page within the class notebook;
   in response to receiving, at the class notebook system, a request to get a permission for the section group of the class notebook, communicating with the file management system to receive the permission for the section group,
      the request comprising the section group identifier and a permission object, and
      the section group of the class notebook being the specific page within the class notebook; and
   in response to receiving, at the class notebook system, a request to delete a permission for the section group of the class notebook, communicating with the file management system to delete the permission for the section group, the request comprising the section group identifier and a permission identifier, and the section group of the class notebook being the specific page within the class notebook.

9. The method of claim 8, wherein the permission object comprises a user display name, a permission identifier, a uniform resource locator of the permission object, a user identifier, and a type of the permission.

10. The method of claim 8, wherein communicating with a file management system to create or update the permission for the section group comprises sending a post request to the file management system.

11. The method of claim 8, wherein communicating with the file management system to receive the permission for the section group comprises sending a get request to the file management system.

12. The method of claim 8, wherein communicating with the file management system to delete the permission for the section group comprises sending a delete request to the file management system.

13. One or more computer readable storage media having instructions stored thereon that when executed by a processing system direct the processing system of a class notebook system to at least:

in response to receiving, at the class notebook system, a request for a guest access link to a specified student's content in a section group of a class notebook, communicate with a file management system to get or create a guest link to the specified student's content in the section group, the specified student's content in the section group being a specific page within the class notebook;

upon receiving the guest link, create, at the class notebook system, the guest access link by appending an online rendering flag to the guest link so a third party can have a live view; and provide the guest access link to a source of the request, the guest access link providing access to only the specific page within the class notebook without providing permissions to any other content in the class notebook.

14. The media of claim 13, wherein the instructions further direct the processing system to at least:

in response to receiving a request to revoke the guest access link to the specified student's content in the section group, communicate with the file management system to remove the guest link.

15. The media of claim 13, wherein instructions that direct the system to communicate with the file management system, direct the system to at least:

request the file management system to get the guest link to the specified student's content in the section group; and receive the guest link or an indication that the guest link does not exist.

16. The media of claim 15, wherein the instructions that direct the system to communicate with the file management system further direct the processing system to at least:

in response to receiving the indication that the guest link does not exist, request the file management system to create the guest link; and receive the guest link.

17. The media of claim 13, wherein the communication with the file management system includes communicating a section group identifier.

18. The media of claim 13, wherein the guest access link grants a read-only permission.

19. The media of claim 13, wherein the guest access link grants an editing permission.

20. The media of claim 13, wherein access to the guest access link does not require authentication.

* * * * *